(12) United States Patent
Currie et al.

(10) Patent No.: US 6,974,239 B2
(45) Date of Patent: *Dec. 13, 2005

(54) COMPOUND OPTICAL AND ELECTRICAL CONDUCTORS, AND CONNECTORS THEREFOR

(76) Inventors: Robert M. Currie, 325 Bavignon, D.D.O. Quebec (CA), H9B 1Y4; Jonas J. Robertson, 2521 Orbit Ct., Harvey, LA (US) 70058

( * ) Notice: Subject to any disclaimer, the term of this patent is extended or adjusted under 35 U.S.C. 154(b) by 0 days.

This patent is subject to a terminal disclaimer.

(21) Appl. No.: 10/449,027

(22) Filed: Jun. 2, 2003

(65) Prior Publication Data

US 2004/0032747 A1 Feb. 19, 2004

Related U.S. Application Data

(63) Continuation-in-part of application No. 10/385,439, filed on Mar. 12, 2003, and a continuation-in-part of application No. 09/670,576, filed on Sep. 27, 2000, now Pat. No. 6,577,794.
(60) Provisional application No. 60/363,607, filed on Mar. 12, 2002.

(51) Int. Cl.[7] ................................................. F21V 7/04
(52) U.S. Cl. ........................ 362/558; 362/551; 385/101
(58) Field of Search ................................ 362/551, 555, 362/559, 581; 385/101, 123

(56) References Cited

U.S. PATENT DOCUMENTS 6,577,794 B1 * 6/2003 Currie et al. ............... 385/101

* cited by examiner

Primary Examiner—John Anthony Ward
(74) Attorney, Agent, or Firm—Merek, Blackman & Voorhees, LLC

(57) ABSTRACT

A compound optical and electrical conductor includes a fiberoptic light transmitting element (multiple fibers or single solid rod) with at least one solar cell with LED therewith. The electrical conductor or conductors may be imbedded or otherwise secured within the optically conducting element or its surrounding jacket or sheath, or may be contained in a separate elongate retainer which may be provided to hold the optically conducting element in place as desired. The conductors may include a jacket or retainer which is optically open along one side thereof, allowing the optical conductor to emit light laterally therefrom subtending an angle defined by the optical gap in the jacket or retainer. One or more compound connectors may be provided, for linking two or more such compound conductors together as desired. The connectors provide for both the concentric alignment of the optical conductors, and also the electrical connection of the electrical conductors of the compound devices. The connectors preferably each include one or more lighting elements (halogen, high output LED, etc.) to compensate for light attenuation along the lengths of the attached optical conductors. The electrically conducting elements of the compound conductors provide electrical power to the lighting elements enclosed within the connectors, to provide an increase in light power at points along the length of an assembly. Different colors of lights may be provided, with the electrical conductors providing for the selective illumination of each as desired.

24 Claims, 10 Drawing Sheets

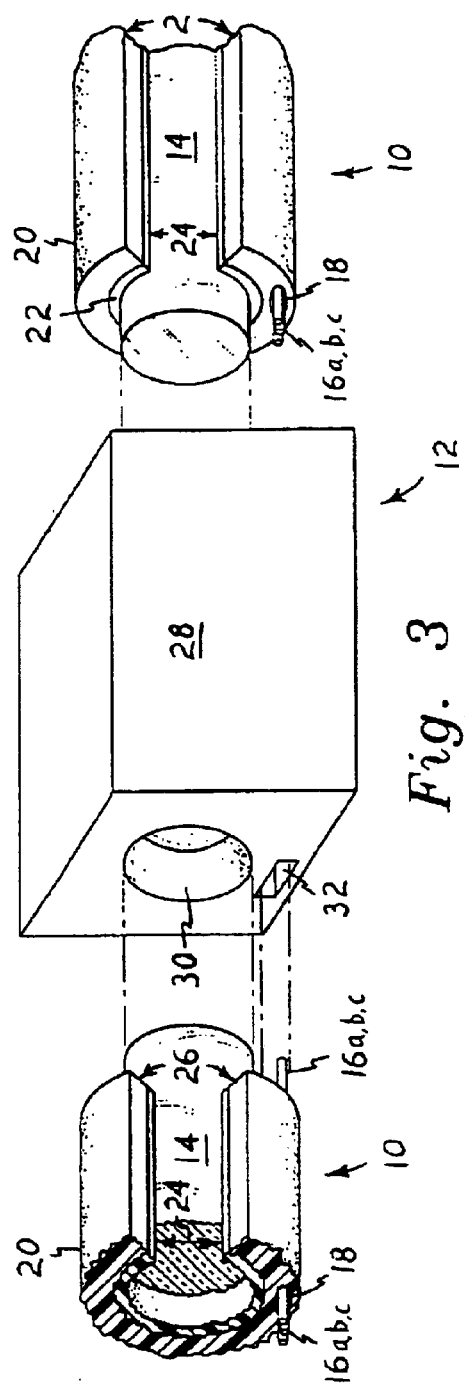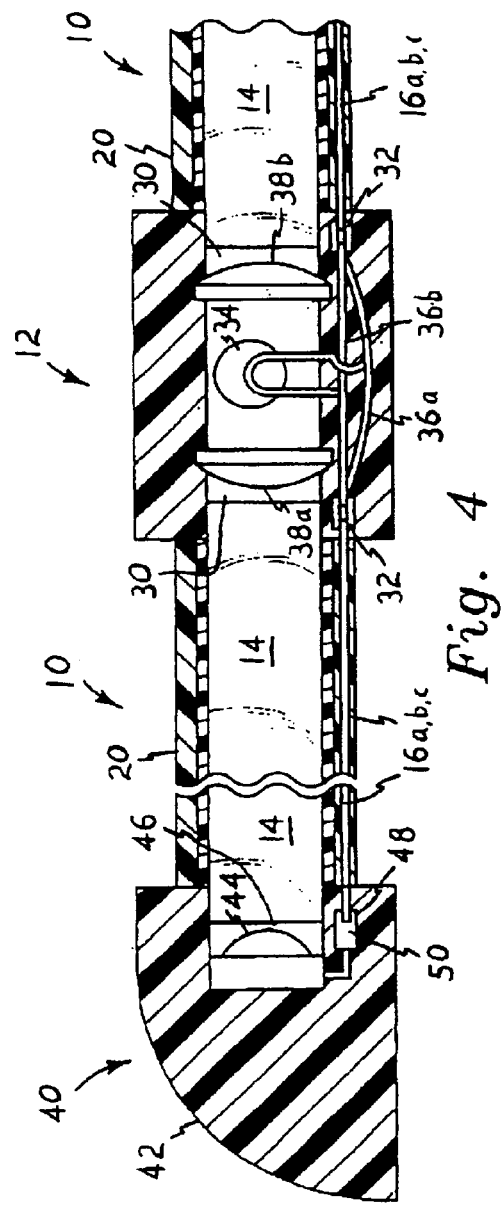

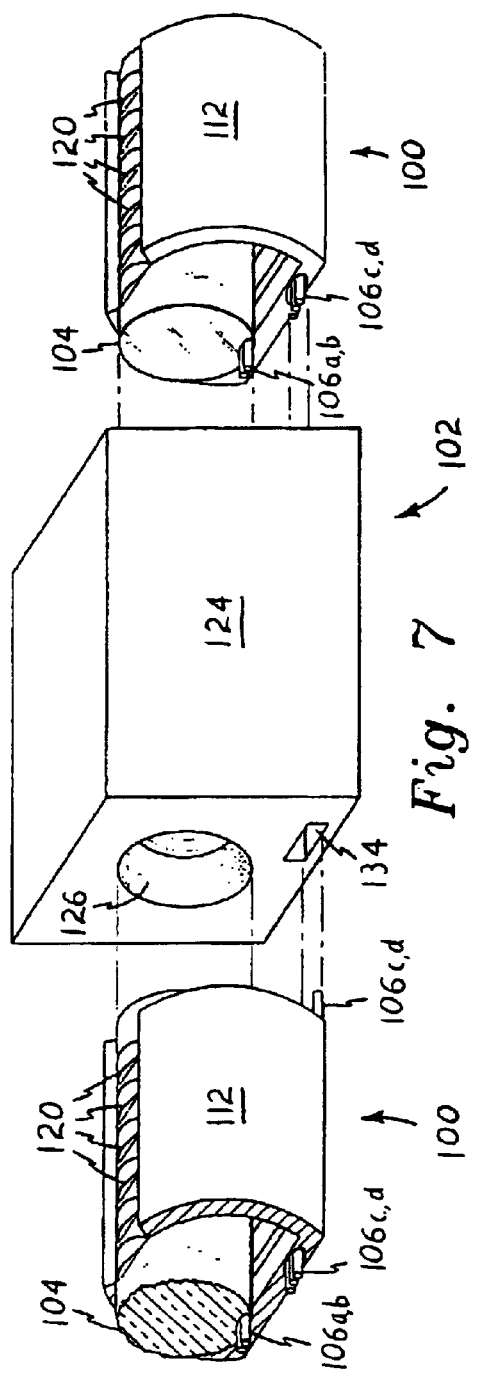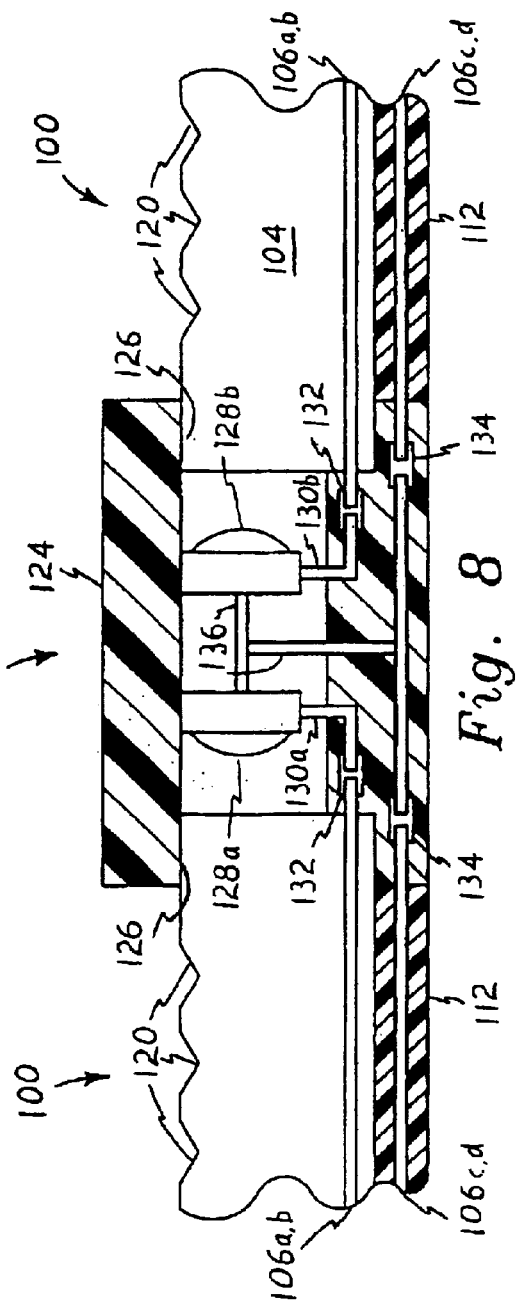

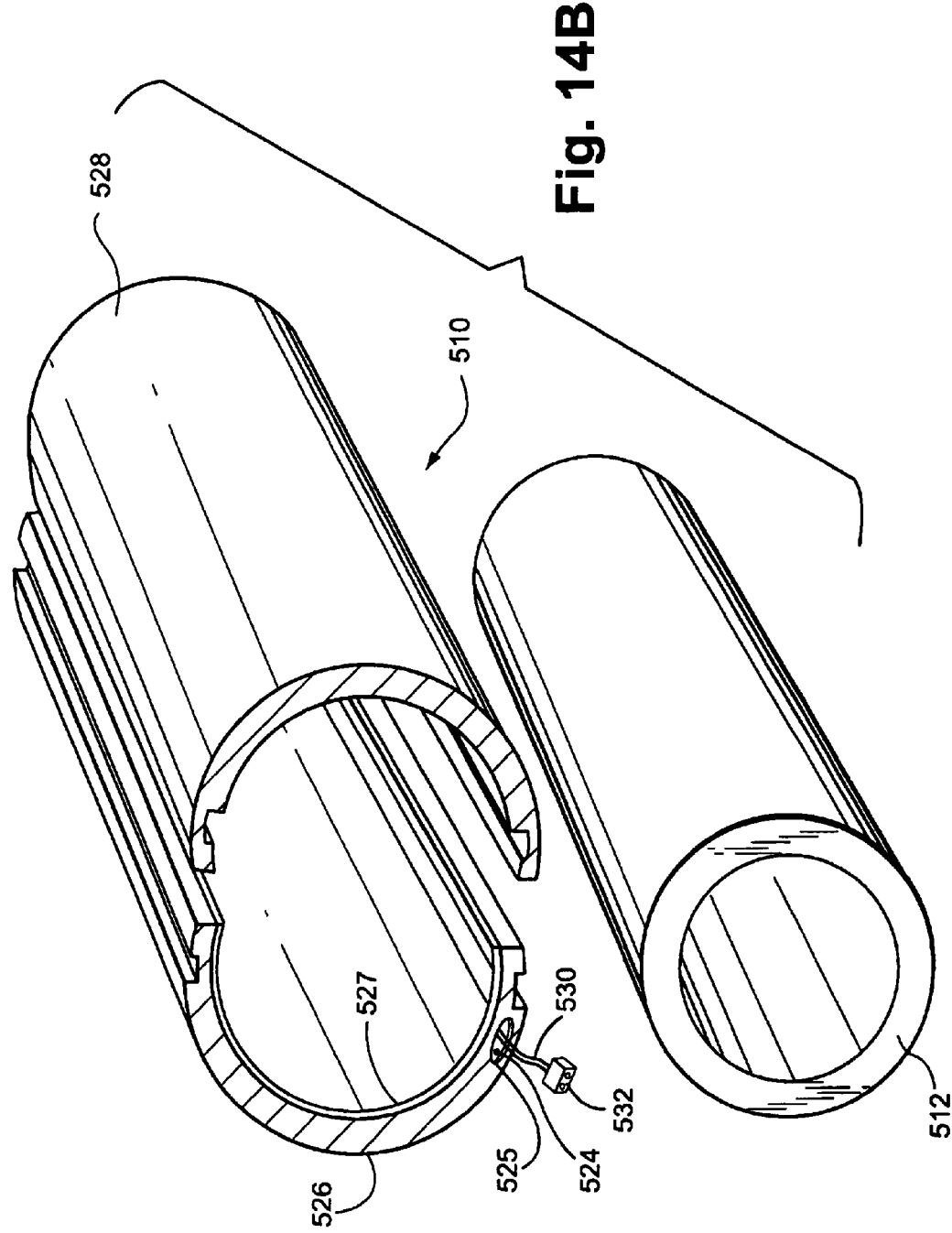

COMPOUND OPTICAL AND ELECTRICAL CONDUCTORS, AND CONNECTORS THEREFOR

REFERENCE TO RELATED PATENT APPLICATION

This application is a continuation in part of and claims the benefit of U.S. patent application Ser. No. 09/670,576 filed Sep. 27, 2000 now U.S. Pat. No. 6,577,794 which is incorporated herein by reference. This application is also a continuation in part of copending U.S. patent application Ser. No. 10/385,439 filed Mar. 12, 2003 entitled "Illuminated Guard Rail" which is incorporated herein by reference and claims benefit of provisional application No. 60/363,607, filed Mar. 12, 2002.

BACKGROUND OF THE INVENTION

1. Field of the Invention

The present invention relates generally to the field of fiberoptic light transmission, and more specifically to fiberoptic or acrylic cables or rods having electrically conductive elements included therewith. A means of electrically and optically connecting a series of individual lengths of such fiberoptic and electrically conductive elements is also disclosed herein.

2. Description of the Related Art

Light transmission using light conductive means (cables, rods, etc.) has been known for some time. Conventionally, such devices generally comprise a generic or specially compounded acrylic plastic (e.g. Lucite,™) formed as single rods or multiple strands or fibers, which are coated for internal reflectivity and encased in an opaque jacket or casing. This system has been used in many applications for the transmittal of light from one end of the cable to the other, i.e. axial transmission of light.

More recently, the inclusion of electrically conductive wiring or cables with fiberoptic cables, has been accomplished. Generally, such compound cables have included the electrically conductive elements within the core of the fiberoptic device, where it affects the light transmissivity of the cable or rod. Alternatively, the electrical conductors have been placed within the surrounding opaque jacket for the fiberoptic cable. In any event, these compound devices of the prior art have been intended for axial light and electrical transmission, and have not provided for radial light emission from the length of the fiberoptic core. Also, such devices have been constructed to have a predetermined length, for installation in certain specific environments (motor vehicles, etc.).

Accordingly, a need will be seen for a compound optical and electrical conductor, which is capable of emitting light radially to serve as a continuous elongate lighting device, while simultaneously carrying electrical current axially through the electrical conductor(s) included therewith. The present invention also includes modular connection means, whereby two or more lengths of such compound conductors may be optically and electrically connected together to form a continuous electrically conductive and light transmissive device.

A discussion of the related art of which the present inventor is aware, and its differences and distinctions from the present invention, is provided below.

U.S. Pat. No. 4,394,714 issued on Jul. 19, 1983 to James Rote, titled 'Step Lighting System', describes a fiberoptic system wherein a series of separate fiberoptic strands extend from a lighting source beneath a step or steps, with their distal ends passing through the nose(s) of the stair tread(s) to provide an indication of the location of the tread nose(s) in darkness. Rote teaches away from any radical emission of light from his fiberoptic strands, as his object is to pass the light axially from the ends of the strands extending through the stair tread nose(s). Moreover, Rote does not disclose or suggest the inclusion of electrical conductors with his fiberoptic strands nor any means of connecting a series of lengths of such strands together, as provided by the present invention.

U.S. Pat. No. 4,806,289 issued on Feb. 21, 1989 to Larry J. Laursen et al., titled 'Method Of Making A Hollow Light Pipe', describes a tubular light transmitting line with cladding on both the inner and outer walls of the tube. Light is transmitted only through the material of the tube itself, between the cladded surfaces. The hollow interior only provides an inner cladding surface for the tube, and does not function for the transmission of light. Laursen et al. make no suggestion or teaching whatsoever that this hollow core may be used for any other purpose, and thus there is no motivation for installing any structure within the hollow core. Also, Laursen et al. does not disclose any connection of multiple lengths of such a light transmission line together, nor any radical light output from his light pipe.

U.S. Pat. No. 4,811,171 issued on Mar. 7, 1989 to Gerald Viola, titled 'Submersible Tail Lights For Boat Trailers', describes a fiberoptic lighting system wherein the electric light source is mounted high above the tongue of the trailer, with non-electrically conductive fiberoptic lines running from the light source to the conventional location of the trailer lighting. Viola teaches away from the present invention, in that he specifically excludes provision for electrical wiring combined with his fiberoptic cables, in order to preclude the problems which occur when electrical systems are immersed in water. The only connection means disclosed, is a connector for the electrical wiring to the light source for the fiberoptics; no compound connection means is disclosed, as no electrical wiring is provided with the fiberoptic lines. Moreover, all Viola's fiberoptic lines emit light axially from their ends; no radial light emission is disclosed.

U.S. Pat. No. 4,947,293 issued on Aug. 7, 1990 to Glenn M. Johnson et al., titled 'Cargo Vehicle Perimeter Clearance Lighting System', describes an elongate light conducting strip which is applied to the perimeter of a large trailer or the like. A light source is provided at some point in the system, with light being transmitted along the light conducting strips secured to the trailer, and with light emitting laterally or radially from the strips. Johnson et al. do not disclose or suggest the inclusion of electrical wiring with their light strips, nor do they provide any connection means for plural strips, as provided by the present fiberoptic and electric cable invention.

U.S. Pat. No. 5,042,894 issued on Aug. 27, 1991 to Gerry El Swemer, titled 'Fiber Optic Lighting System', describes a highway sign incorporating fiberoptics for illuminating a series of points on the sign from a single light source, with their distal light transmitting ends arranged to form messages, directional indicators, instructions, etc. Light is only emitted axially from the ends of the strands. Radial light transmission is not desired in such a sign, as it would dissipate the light emitted from the ends of the strands to form the sign message. Moreover, no inclusion of electrical wiring with the fiberoptic strands is disclosed by Swemer, nor is any means of connecting such compound cables, or even lengths of fiberoptic cables alone, disclosed.

U.S. Pat. No. 5,400,225 issued on Mar. 21, 1995 to Joseph E. Currie, titled 'Optical Fiber Illumination Device', describes a lighting system for a motor vehicle, in which the fiberoptic line passes around the perimeter of the rear window to enhance the operation of the brake, directional, and tail lights of the vehicle. Means for transmitting different colors through the fiberoptic line are provided, as well as electrical circuitry for the light source and means of attaching the fiberoptic line to the vehicle. However, no combining of electrical and fiberoptic line is disclosed, nor is any means of connecting a series of such lines disclosed. Moreover, the '225 U.S. Patent teaches away from the radial emission of light from the fiberoptic line, due to the need to transmit the light axially to the distal vehicle light location.

U.S. Pat. No. 5,465,194 issued on Nov. 7, 1995 to Joseph E. Currie, titled 'Optical Fiber Illumination Device,' is a continuation in part of the '225 U.S. Patent to the same inventor, discussed immediately above. The '194 U.S. Patent provides additional features and details not fully disclosed in the above cited '225 U.S. Patent. However, the '194 Patent also fails to disclose incorporation of electrical wiring with fiberoptic cables, radial light emission form such cables or lines, and means for connecting compound fiberoptic and electrical cable lengths together, each of which feature is a part of the present fiberoptic and electrical conductor and connector invention.

U.S. Pat. No. 5,495,400 issued on Feb. 27, 1996 to Joseph E. Currie, titled 'Optical Fiber Illumination Device', is another continuation in part of the '225 U.S. Patent to the same inventor, discussed further above. The '400 Patent describes an operating system essentially the same as that used in the devices of the '225 and '294 U.S. Patents cited above, but providing light to an elongate fiberoptic rod or the like which is secured to the side of a motor vehicle (e.g., pickup truck, trailer, etc.). The fiberoptic rod emits light laterally or axially from its side, rather than conducting light through the length of the device to emit the light axially at a distal end thereof, as in the devices of the '225 and '194 U.S. Patents. However, no combination of electrical and optical conducting elements is disclosed for connecting a series of such compound conductors, as provided by the present invention.

U.S. Pat. No. 5,557,698 issued on Sep. 17, 1996 to Galen M. Gareis et al., titled 'Coaxial Fiber Optic Cable', describes a compound cable including one or more centrally disposed fiber optic lines surrounded by at least two mutually insulated layers of coaxially wrapped electrically conductive material. While this structure is capable of simultaneously conducting light and electrical signals, it teaches away from the present invention, as the fiberoptic cables are precluded from radial light transmission due to the surrounding coaxial electrical conductors. In contrast, the present invention provides for the carriage of electrical conductors with a fiberoptic cable, but also provides for the radial emission of light from the fiberoptic strands or rod of the cable; the Gareis et al. cable cannot perform this function. Moreover, no connecting means is provided by Gareis et al. for their cable.

U.S. Pat. No. 5,602,948 issued on Feb. 11, 1997 to Joseph E. Currie, titled 'Fiber Optic Illumination Device', describes a portable lighting device for use with a motor vehicle. The device includes a portable light source which receives electrical power form the vehicle's electrical system, with a fiberoptic cable extending form the light source. The cable provides axial light emission for lighting a work area, and also provides radial light emission along its length as an emergency lighting means. However, no inclusion of electrical conductors is provided, nor is any means of connecting a series of such optical conductors disclosed in the '948 U.S. Patent.

U.S. Pat. No. 5,664,863 issued on Sep. 9, 1997 to William J. Cassarly et al., titled 'Compact Uniform Beam Spreader For A High Brightness Centralized Lighting System', describes a lens system for spreading the relatively narrow output from the end of a fiberoptic line. The Cassarly et al. system teaches away from the present radially emitting fiberoptic system, as Cassarly et al. state that the side walls of their fiberoptic cables provide total reflectance (abstract). In any event, Cassarly et al. do not disclose the compound fiberoptic and electrical conductors of the present invention, nor any means for connecting two or more such compound conductors together, as provided by the present inventions.

U.S. Pat. No. 5,796,904 issued on Aug. 18, 1998 to Michael A. Marinelli et al., titled 'Electrical Continuity Interlock For A Laser-Based Fiber Optic Vehicle Lighting System', describes a system for detecting a discontinuity in a fiberoptic line. A compound fiberoptic and electrical cable is provided, with the fiberoptic cable transmitting light axially from a laser light source to a remote location (e.g., vehicle tail light, etc.). The Marinelli et al. system detects any discontinuity in the line to shut down the laser source in such an occurrence, to prevent laser operation with the fiberoptic cable disconnected. Marinelli et al. teach away from the present radially or side emitting fiberoptic system, and moreover use the electrical conductors only to transmit a signal, rather than to supply power to intermediate lights in a length of fiberoptic cable, as in the present invention. No connecting means are disclosed by Marinelli et al. for their system.

U.S. Pat. No. 5,838,860 issued on Nov. 17, 1998 to Brett M. Kingstone et al., titled 'Fiber Optic Light Source Apparatus and Method', describes a light source including a high intensity lamp, reflector, heat sink, and color filter positioned between the lamp and reflector and the light receiving end of the fiberoptic line. Various fiberoptic cable embodiments are also disclosed. However, Kingstone et al. do not describe any means of including electrical wiring with their fiberoptic cable. While Kingstone et al. disclose a means of securing the light receiving end of the cable to the light source, they do not disclose any means of coupling or securing multiple cables together in an end to end manner, as provided by the present invention.

U.S. Pat. No. 5,855,382 issued on Jan. 5, 1999 to James J. Reilly et al., titled Roller Skate Lighting Device', describes a fiberoptic rod, light source, and small battery power supply which is attachable to the side(s) of an inline skate. Reilly et al. provide only a single light source at one end of the fiberoptic rod, rather than multiple light sources positioned along the length of a fiberoptic line assembly, as provided by the present invention. Moreover, as the Reilly et al. inline skate fiberoptic device is relatively short, no means of connecting a series of such devices together is disclosed. Also, Reilly et al. do not disclose the incorporation of electrical wiring along the length of the fiberoptic rod, whereas the present invention includes such a compound optically and electrically transmitting fiberoptic cable, rod or line.

U.S. Pat. No. 5,915,830 issued on Jun. 29, 1999 to Floyd R. Dickson et al., titled 'Light-Tube Running Board Lighting', describes a fiberoptic rod(s) installed along the running board(s) of a motor vehicle. Dickson et al. also disclose an (apparently opaque) outer sheath, with a portion of the sheath removed along the length of the fiberoptic rod for the rod to transmit light radically therefrom in a relatively narrow angular pattern from the rod, rather than omnidirectionally from the sides of the rod. However, Dickson et al. fail to disclose the inclusion of electrical wiring with their fiberoptic lighting device, and do not disclose any form of connecting means for connecting two or more such fiberoptic devices together in line, as provided by the present fiberoptic lighting invention.

British Patent Publication No. 1,479,427 published on Jul. 13, 1977 to BICC Limited, titled 'Improvements In Or Relating To Optical Cables', describes a fiberoptic cable including elongate reinforcing strands therein. The reinforcement may comprise any suitable material, with the disclosure mentioning metal, among others. The '427 British Publication also notes that the cable may include one or more electrical conductors. However, the fiberoptic components of each embodiment are encased in opaque sheaths or jackets, and/or surrounded by other opaque structure, so that no lateral light emission is possible. Moreover, no means of coupling two or more lengths of the BICC, Ltd. cable together, and providing additional light for each connected section, is disclosed in the British Publication, which means are a part of the present invention.

Finally, British patent Publication NO. 2,168,824 published on Jun. 25, 1986 to Telephone Cables Limited, titled 'Optical Fibre Cables Containing An Electrical Conductor', describes a cable resembling that of the '427 British Patent Publication described immediately above. However, as in the case of the cable of the '427 British Publication noted above, the '824 cable does not provide for lateral or radial emission of light from the cable. At least some of the various layers of sheathing surrounding the fiberoptic elements, are opaque, as indicated by the provision for 'armouring or protection . . . against magnetic or electrostatic interference . . . ' (page 1, lines 107–109). Also, no disclosure is made of any form of coupling or connecting means for securing two or more lengths of such cable together, as provided by the present compound fiberoptic and electrical conductor invention.

None of the above inventions and patents, either singly or in combination, is seen to describe the instant invention as claimed.

SUMMARY OF THE INVENTION

The present invention comprises a compound optical or light transmitting and electrical conductor, with the optical conducting element composed of a plurality of optical fibers or strands or a single optically transmitting rod or the like. The conductor further includes at least one electrical conductor therewith, extending the length of the cable with the optically conducting element. One or more connectors may be used to secure two or more such conductors together, as desired. Depending on the shape of the connectors, a multifaceted connector could also be used to simultaneously connect more than two connectors together in a endless myriad of various shapes such as a t-shaped, cross-shaped, spoked, or star shaped, etc.

The present compound conductors provide lateral light emission and are adapted particularly for warning and/or marking lights installed along a large panel or the like. The present lighting system may be installed along the sides of trailers, boats, and ships, etc., as desired.

Due to light attenuation along the length of such a fiberoptic device, additional light must be provided at various points therealong. The connectors include such supplemental lighting means, with the electrical of the devices supplying the electrical energy required for the supplemental lighting at each of the connectors. The connectors may further include means for coloring or filtering the light emitted therefrom, in order to provide a specific color from the light emitting portions of the conductors.

Accordingly, it is a principal object of the invention to provide an improved compound optical and electrical conductor, including optical and electrical transmission means therein.

It is another object of the invention to provide an improved compound optical and electrical conductor, which electrical conducting elements may be installed within the optically conducting portion or which may be installed within a base or retaining component for the optically conducting element.

Yet another object of the present invention is to provide an improved compound optical electrical conductor including an opaque outer jacket with a longitudinal light transmissive opening, for emitting light laterally in a defined arc from the conductor.

It is a further object of the invention to provide an improved compound optical and electrical conductor including connector means therewith, for optically connecting two or more such compound conductor elements together as desired.

An additional object of the invention is to provide an improved compound optical and electrical conductor, which connector means, includes additional lighting for compensating for light attenuation along the length of the optically conducting elements.

Still another object of the invention is to provide a compound optical and electrical conductor, which connector means include means for providing different light colors to the attached optical conductor.

A further object of the invention is to provide a compound optical and electrical conductor, having an electrical conductor on an outer surface of the optical connector for connecting lighting elements and other devices in electrical communication with the compound optical and electrical conductor.

It is the object of the present invention to describe a method and the means for illuminating bridge and other railings using state of the art technology.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 3 is an exploded perspective view of opposite ends of two conductors of FIGS. 1 and 2, and a compound optical and electrical connector therewith.

FIG. 4 is a side elevation view in section of the conductor and connector assembly of FIG. 3 showing their assembly together, and further illustrating an end cap device.

FIG. 7 is an exploded perspective view of opposite ends of two conductors of FIGS. 5 and 6, and a compound optical and electrical connector therewith.

FIG. 8 is a side elevation view in section of the conductor and connector assembly of FIG. 7 showing their assembly together.

FIG. 14B shows an exploded view of the acrylic covering of the guard rail.

Similar reference characters denote corresponding features consistently throughout the attached drawings.

DETAILED DESCRIPTION OF THE PREFERRED EMBODIMENTS

Figure 1:
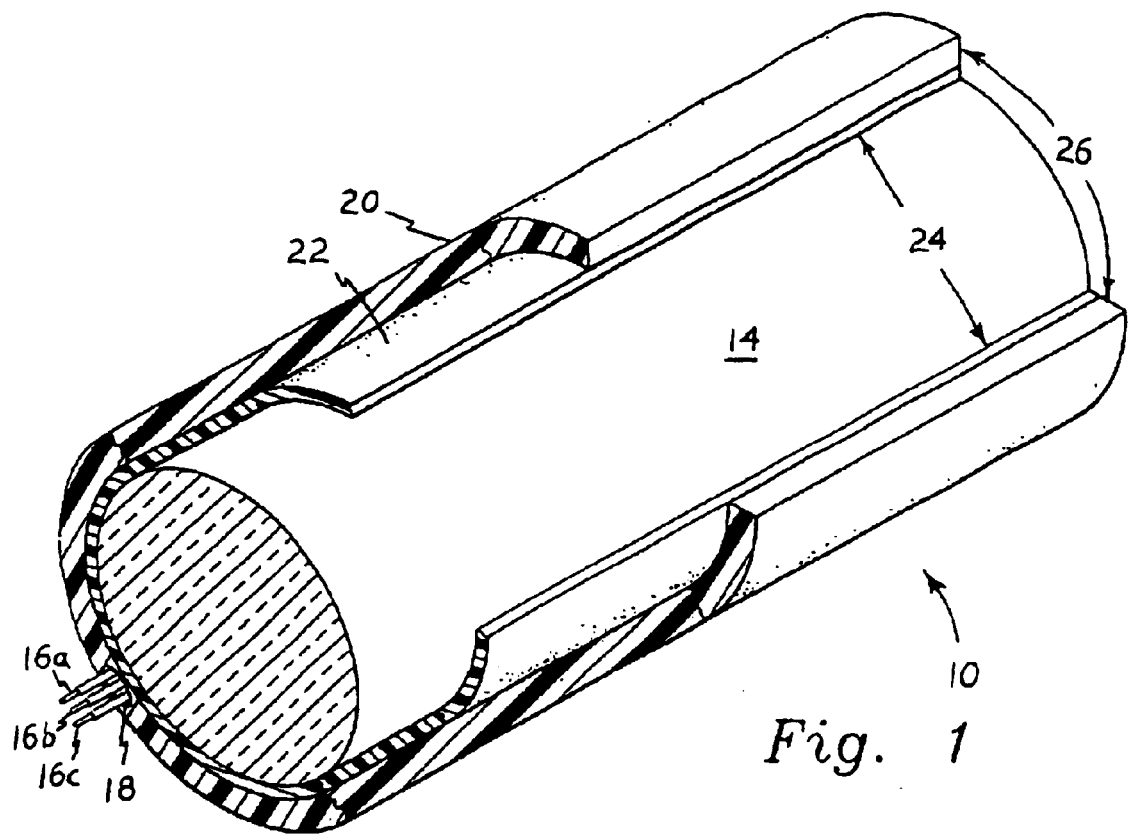
FIG. 1 is a perspective view in partial section, showing the various elements of a first embodiment of the present compound conductor invention.
Figure 2:
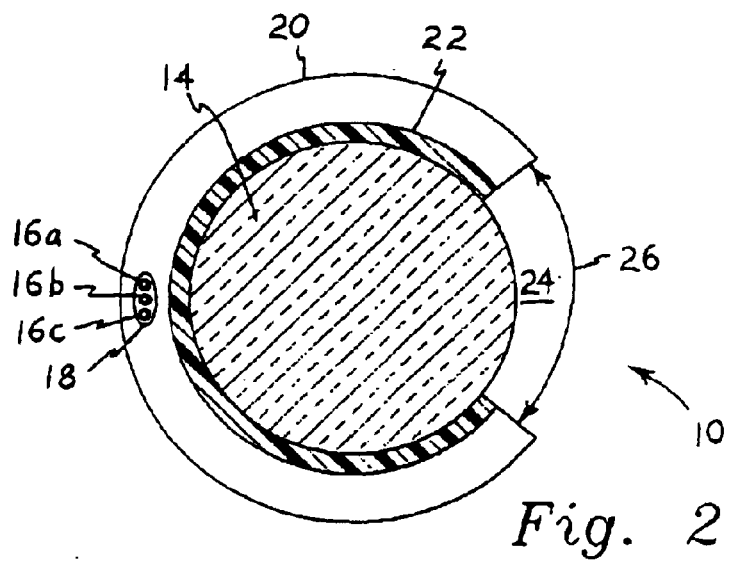
FIG. 2 is an end elevation view in section of the compound conductor of FIG. 1.
Figure 5:
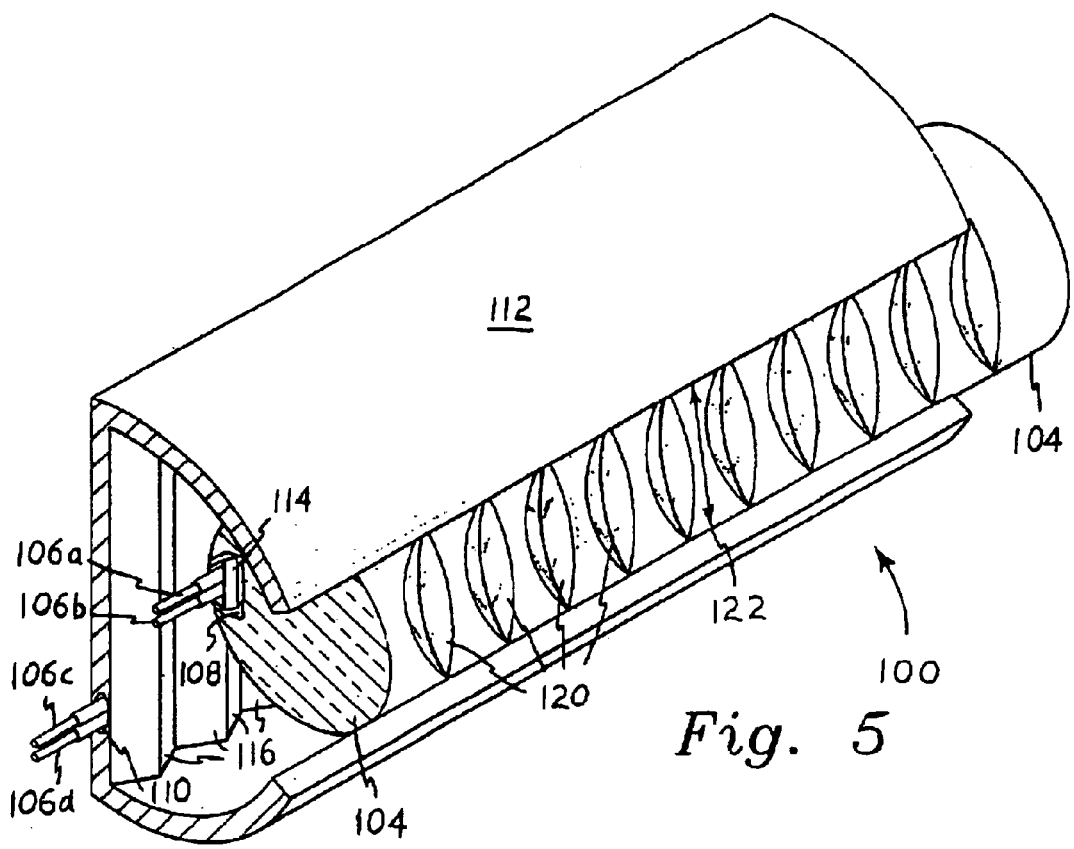
FIG. 5 is a perspective view in partial section, showing the various elements of a second embodiment of the present compound conductor invention.

The present invention comprises various embodiments of compound optical and electrical conductors, and includes cooperating connectors permitting two or more such conductors to be linked together optically and electrically. The electrical conductors provide electrical power for lighting installed within each connector, with each connector thus providing an additional light source to compensate for attenuation along the length of the optical conductor. The present conductors emit light laterally ('side lighting'), and thus are particularly well suited for use in lighting and marking large moving objects, e.g. tractor trailers, larger van type trucks, and even smaller pickup trucks and vans. It will be seen that their application may be carried over to boats, ships, and aircraft as well, and may be used to mark large stationary objects in close quarters (narrow alleyways, loading docks, etc.) and for advertising and display purposes as well.

FIGS. 1 through 4 illustrate a first embodiment of the present invention, comprising a compound optical and electrical conductor 10 and cooperating connector 12 (shown in FIGS. 3 and 4). The larger mass and volume of the conductor 10 comprises a light transmitting element 14 (conventional fiberoptic cable formed of a plurality of individual fiberoptic strands, or one or more large diameter, solid core elements, as shown). The use of solid acrylic plastic material for the optical conductor element 14 precludes any requirement for ultraviolet protection, as necessary for other materials specially formulated for light transmission.

One or more electrical conductors, e.g., conductors 16a through 16c of FIGS. 1 through 4, extend through a passage 18 formed in the opaque polymer outer jacket or protective sheath 20 of the conductor assembly 10. It will be noted that only a single electrical conductor is required where all connector lighting is to be actuated simultaneously, and the assembly is electrically grounded to the vehicle structure. However, the present invention also provides for plural lights which may be selectively actuated as desired, to provide different colors of illumination for the optical conductors as desired. Such plural lights may be selectively operated by a corresponding electrical conductor and conventional switch apparatus (not shown).

A reflective coating 22 (tape, paint, etc.) may also be applied around the majority of the circumference of the optical conductor 14, to provide greater brightness for the optical element 14. It will be noted that the outer sheath 20 and reflective coating 22 have an optically open side 24 extending arcuately about a portion of the optical conductor 14, and extending the length of the optical conductor 14. The light thus emitted from this optically open lateral passage 24 subtends an arc 26 defined by the width of the optically open passage 24, for emitting light radially and laterally from the optical conductor 14. In the event that a specially formed light transmitting material is used for the light conductor 14 (e.g., Lucite,tm), an ultraviolet protective barrier (not shown) may be applied to the material to preclude yellowing due to ultraviolet exposure, as is known to the art.

A cooperating compound connector 12 for the above described conductors 10 is shown in FIGS. 3 and 4 of the drawings. The connector 12 comprises a housing 28 having mutually concentric light passages 30 at opposite ends thereof. It will be seen that the connector may be formed to have more than two opposed light passages, e.g., a light passage formed in each face thereof, or may be formed in a shape other than a rectangular solid to provide additional light passages at other than rectilinear angles. One skilled in the art would appreciate that additional light passages and electrical receptacles could be provided on each of the six sides of the compound connector 1212 (See FIG. 12 described below). Alternatively, other shapes (not shown) could be used to form a multifaceted compound connector to allow multiple compound conductors 10 to be connected. These shapes could include, but are not limited to, spoke shaped, T-shaped, X-shaped, cross-shaped, etc., that allow light to be communicated from the compound connector to the optical conductors 14.

Figure 12:
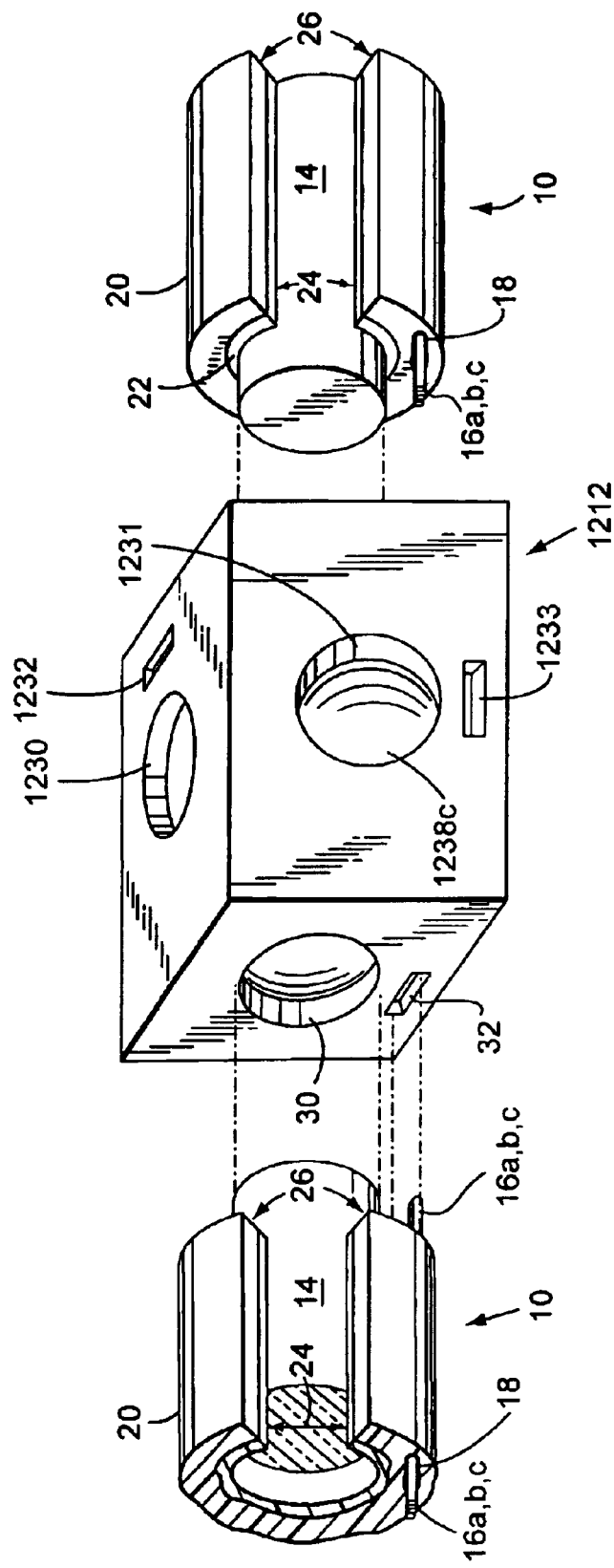
FIG. 12 is an exploded perspective view of opposite ends of two conductors of FIGS. 1 and 2, and a multifaceted compound optical and electrical connector therewith according to an additional embodiment of the invention.

FIG. 12 shows a connector for receiving more than two conductors assemblies 10. Additional conductor assemblies 10 can be inserted and optically and electrically connected to the connector 1212 through light passages 1230, 1231 and electrical receptacles 1232, 1233. An additional lens 1238c could also be provided in each light passage to focus the light from the light source(s) 34 to each optical conductor 14 extending from each side or end of the connector 1212.

A corresponding number of electrical connector receptacles 32 is also provided adjacent each light passage 30, for accepting the connecting ends of the electrical conductors 16a through 16c (or other number of electrical conductors) and electrically connecting the electrical conductors to the light means housed within the connector housing 28. It will be seen that the receptacles 32 are equipped with conventional multiple pin sockets, e.g., Molex™ connectors, etc., in order to separate the electrical conductors 16a through 16c electrically from one another.

The optical conductors 14 of two (or more) separate compound conductors 10 are inserted into the corresponding optical connector receptacles or light passages 30 of the housing 28, with the axially offset electrical conductors 16a through 16c connecting with the electrical receptacles 32 which are in registry with the wiring 16a through 16c. The connector ends of the wiring 16a through 16c are preferable sufficiently heavy and rigid to provide the compressive and bending strength necessary to 'plug in' to the corresponding receptacles 32.

FIG. 4 provides a cross sectional view of such an assembly, and the internal components of the connector 12. The connector 12 includes some form of electrical lighting means therein, such as the electrically driven light source 34 shown, which receives electrical power from the corresponding electrical conductors 36a, 36b which communicate electrically with at least two of the conductors 16a through 16c of the compound conductors 10. It will be understood that this light source 34 may comprise any practicable type desired, e.g., incandescent, halogen, bright light emitting diode, etc. Lenses 38a, 38b are provided to each side of the light means 34, to focus the light from the light source(s) 34 to each optical conductor 14 extending from each side or end of the connector 12, thereby serving to compensate for light attenuation through the optical conductors 14 extending to each side thereof.

More than a single light source 34 may be provided within the connector, as illustrated in FIG. 8 of the drawings and discussed in detail further below. These plural light sources may be colored differently from one another, with electrical power being selectively applied to each separately or collectively to provide different colored light emission form the connected optical conductors 14. In the case of a motor vehicle or trailer, these different lights may be correspondingly colored and electrically connected to the overall lighting system, brake light and turn signal switches, etc., to actuate automatically when those systems are operated. This is especially useful when a multifaceted connector such as that shown in FIG. 12 is used, to fully illuminate the various branches of the optical conductor chain.

FIG. 4 also illustrates a cross sectional view of an end cap assembly 40 which may be incorporated with the present compound conductor assembly 10, and/or modified for use with other embodiments as desired. The end cap 40 includes a housing 42 which contains one or more light sources, e.g., bright light emitting diode 44, etc. A single light passage 46 for accepting the end of an optical conductor 14 is formed in one side or end of the housing 42, concentrically with the light source 44 and optical conductor 14 connected thereto. A corresponding single electrical receptacle 48 is also provided, aligned with the one or more electrical conductors 16a through 16c for electrically connecting those conductors to an electrical conductor (s) 50 supplying electrical energy to the light source 44. The end cap assembly 40 thus essentially resembles one half of the connector assembly 12, with one side or end of the end cap 40 comprising an opaque closure.

FIGS. 5 through 8 illustrate another embodiment of the present compound conductor invention, essentially comprising a compound conductor 100 and cooperating compound connector 102 (shown in FIGS. 7 and 8). The conductor 100 includes a light transmitting element 104 and one or more electrical conductors, e.g., conductors 106a through 106d of FIGS. 5 through 8. These electrical conductors may be grouped in a single cable or bundle, as in the conductors 16a through 16c of the first embodiment of FIGS. 1 through 4, or may be grouped in two or more runs each consisting of one or more conductors 106a, 106b and 106c, 106d, as shown in FIGS. 5 through 8.

In FIGS. 5 through 8, a first group of electrical conductors 106a, 106b, is installed in a channel 108 which is formed in the periphery of the optical conductor element 104, with a second group of electrical conductors 106c, 106d installed in a passage 110 formed in the partially surrounding retainer 112 for the optical conductor element 104. The electrical conductors 106a, 106b are preferably installed in the optical conductor channel 108 as an assembly with a reflective element 114 disposed immediately above, i.e., inwardly toward the center of the optical conductor 104, relative to the electrical conductors or wires 106a, 106b.

This reflective element 114 may comprise a series of polished or brightly colored (white, etc.) laterally disposed facets along the length of the electrical conductor assembly, with the assembly comprising conductors 106a, 106b, and reflective elements 114 snapping in place or being inserted from one end of the optical conductor channel 108. The reflective element 114 adds considerable brilliance to the optical conductor element, and may be formed in various alternative ways, e.g., etching the surface to provide a 'frosted' appearance, etc., as desired.

In a similar manner, the retainer 112 may include a series of laterally disposed facets 116 extending across the floor thereof, to provide greater reflectivity and brilliance for the overlying optical conductor 104 of the assembly. Alternatively, the floor of the retainer 112 may be coated with an outwardly reflective or phosphorescent tape or other coating 118, as shown in FIG. 6 of the drawings.

It will be seen that the optical conductor 104 may alternatively be formed with a hollow core to have a toroidal cross section, with one or more electrical conductor(s) passing through the hollow center of the optical element 104. Such a hollow core optical conductor is illustrated in U.S. Pat. No. 4,806,289 discussed in detail in the discussion of the related art further above . . . the optical conductor 104 may also be formed with a series of laterally disposed reflective facets 120 formed in the upper or outer surface thereof if so desired, as shown in FIGS. 5 through 8 of the drawings. Such material is manufactured by the 3M company and is know as 'Extraction Fiber'™, and may be incorporated with the present invention, if so desired.

Figure 6:
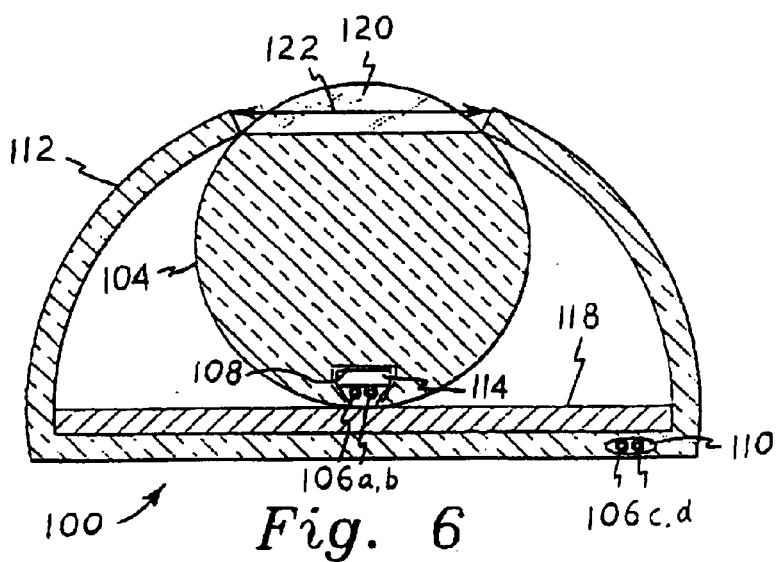
FIG. 6 is an end elevation view in section of the compound conductor of FIG. 5.

The retainer or track 112 of the compound conductor embodiment 100 of FIGS. 5 through 8 is configured somewhat like the jacket or cover 20 of the compound conductor of FIGS. 1 through 4, in that retainer 112 surrounds the majority of the optical conductor 104, with a relatively narrow light emitting passage 122 formed longitudinally along one side thereof. This limits the light output to an arc defined by the optically open passage 122, in a manner similar to that of the optically open passage 24 of the jacket 20 of the embodiment of FIGS. 1 through 4. Alternatively, the retainer 112 may be formed of a transparent or translucent material (plastic, etc.), as shown in FIG. 6 of the drawings, thus providing a wider arcuate light output therefrom. The arcuate light passage opening 122 of the retainer 112 also provides access for the installation of the optical conductor 104 therein.

A cooperating compound connector 102 for the optical conductors 100 is illustrated in FIGS. 7 and 8 of the drawings. The connector 102 of FIGS. 7 and 8 is configured similarly to the first embodiment connector 12 of FIGS. 3 and 4, comprising a housing 124 with lighting means therein. The housing may have two or more light passages 126, which serve as means for connecting a series (two or more) optical conductors 104 thereto.

FIG. 8 provides a cross sectional view of such an assembly, and the internal components of the connector 102.

The connector 102 includes a plurality of lighting means therein (i.e., at least two lights 128a and 128b) which receive electrical power from the corresponding electrical conductors 130a, 130b which communicate electrically with at least two of the conductors 106a, 106b by means of a receptacle or connector 132. The lights 128a and 128b may comprise any practicable electrical light type desired, e.g., incandescent, halogen, bright light emitting diode, etc. Preferably, each of the lights 128a, 128b comprises a plurality of electrically separate bright light emitting diodes (LEDs) of different colors (e.g., red, amber, etc.), which are known in the art. The multiple electrical conductors 106a, 106b may selectively provide electrical power to each LED as desired, to illuminate the corresponding optical conductor with the color of the illuminated LED. Further selectivity for additional LEDs may be provided by multiple ground connections through the electrical conductors 106c, 106d and corresponding connectors 134, rather than the common ground indicated by the connector electrical conductor 136.

Figure 9:
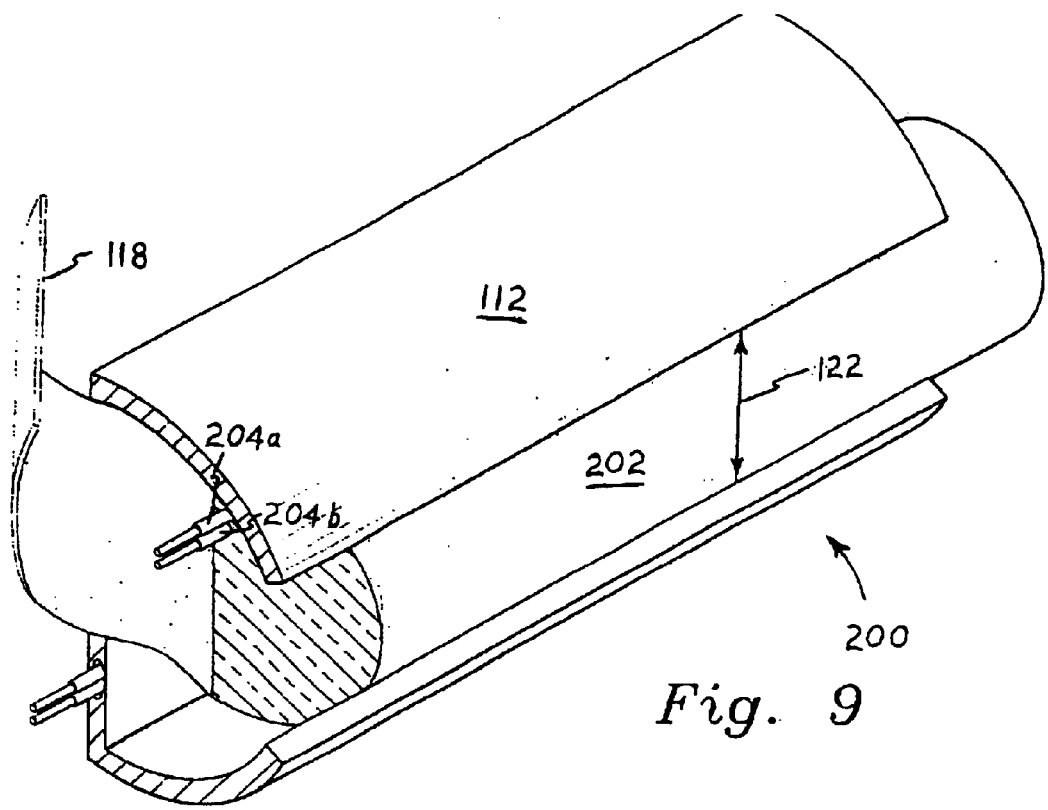
FIG. 9 is a perspective view in partial section, showing the various elements of a third embodiment of the present compound conductor invention.
Figure 10:
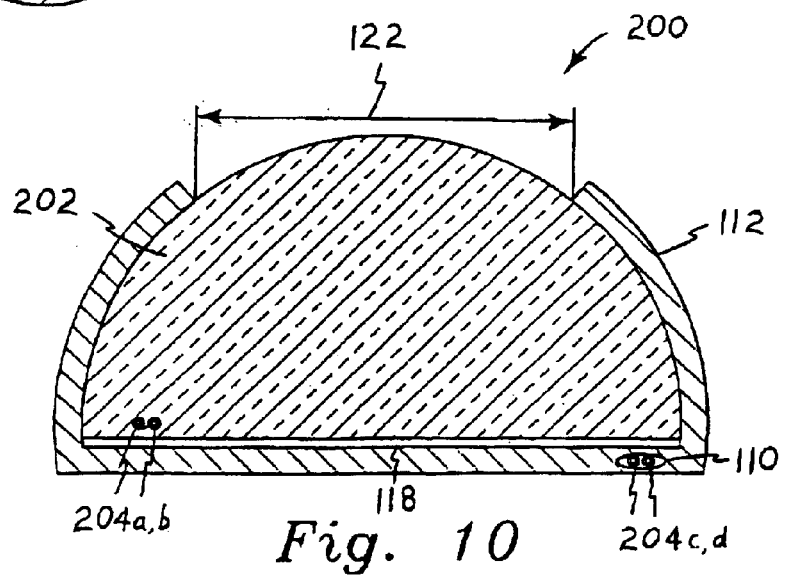
FIG. 10 is an end elevation view in section of the compound conductor of FIG. 9.

FIGS. 9 and 10 illustrate yet another embodiment of the present compound optical and electrical conductor invention, wherein the compound conductor 200 includes an optical conductor element 202 having a semicircular of D-shaped cross section. This cross sectional shape is well suited for installation within a correspondingly shaped retainer or jacket 112, identical to the generally D-shaped retainer or jacket 112 illustrated in FIGS. 5 through 8 of the drawings for the second embodiment compound conductor 100.

However, in the embodiment of FIGS. 9 and 10, the first electrical conductors 204a, 204b are imbedded integrally within the body of the optical conductor 202. This may be done at the time of manufacture of the optical conductor 202, by casting or molding the wiring 204a, 204b in place simultaneously with the casting or molding of the optical conductor 202. Preferably, the electrical conductors or wiring 204a, 204b are positioned well away from the optically exposed surface of the optical conductor 202, in order to provide optimum light output from the device. The electrical conductors 204a, 204b may be wrapped or otherwise covered with a highly reflective or phosphorescent coating in order to provide greater reflectivity and light output, if so desired.

In a similar manner, the electrical conductors 204c, 204d may be cast or molded integrally within the base or other area of the retainer 112 at the time of manufacture, if so desired, or run through a conduit or passage 110 formed in the retainer 112, as in the embodiment of FIGS. 5 through 8 of the drawings.

As in the cases of the other embodiments shown in FIGS. 1 through 8 and discussed further above, the retainer 112 surrounds the majority of the optical conductor 202, with a relatively narrow light emitting passage 122 formed longitudinally along one side thereof. This limits the light output to an arc defined by the optically open passage 122, in a manner similar to that of the optically open passage 24 of the jacket 20 of the embodiment of FIGS. 1 through 4. Alternatively, the retainer 112 may be formed of a transparent or translucent material (Plastic, etc.), as shown in FIG. 6 of the drawings, thus providing a wider arcuate light output therefrom. The arcuate light passage opening 122 of the retainer 112 also provides access for the installation of the optical conductor 202 therein. A sheet or coating 118 of highly reflective or phosphorescent material (tape, etc.) may be applied to the bottom or flat surface of the generally D-shaped retainer 112, as in the embodiment of FIG. 6 of the drawings. This adds further reflectivity and brightness to the assembly, for even greater efficiency.

While no connector component is illustrated for the compound conductor embodiment of FIGS. 9 and 10, it will be seen that either of the connector embodiments 12 or 102, respectively of FIGS. 3, 4 and 7, 8 may be adapted to mate with such a D-shaped optical conductor element 202. Similarly, the end cap element 40 illustrated in FIG. 4 of the drawings may also be adapted for use with any of the other optical conductor elements of the present invention, as desired.

In conclusion, the present compound conductor invention serves as an efficient means of providing a cautionary or warning illumination for a vast number of moving and stationary objects. It is well known that optical conductors ('fiberoptics') dissipate their illumination along their lengths, and until the development of the present invention, were not suitable for marking relatively long spans due to the light loss along the length thereof. The present invention, with its periodic lighting means installed at the connectors thereof and the additional electrical conductors providing electrical power for the lighting means, overcomes this problem to enable such fiberoptic type lighting to be used over spans of indefinite length as desired.

The present compound conductor and connector invention may be applied to virtually any mating surface, as desired. A primary application of the present invention is for relatively long tractor trailers, where the continuously lighted optical conductor span provides a significant advantage over existing plural marker lights of conventional trailer light installations. Moreover, the present optical conductor, with its multiple LED embodiments, can provide color changes depending upon the specific LED(s) energized, to correspond with brake lights, turn signals, etc., as desired.

The present invention is also adaptable to any of a number of other stationary and moving structures, such as narrow loading docks for guidance in poorly lighted conditions, stairways and particularly hand rails, theater aisles, boats and ships, aircraft, etc. The present compound conductors may be secured to any of these structures by conventional adhesive means or mechanical means (nuts and bolts, screws, blind fasteners, etc.), as desired, for adaptability to virtually any stationary or moving vehicle or other structure. The present invention thus provides a significant advance in safety for anyone or any structure or vehicle which has occasion to operate in less than optimally lighted areas.

Figure 11:
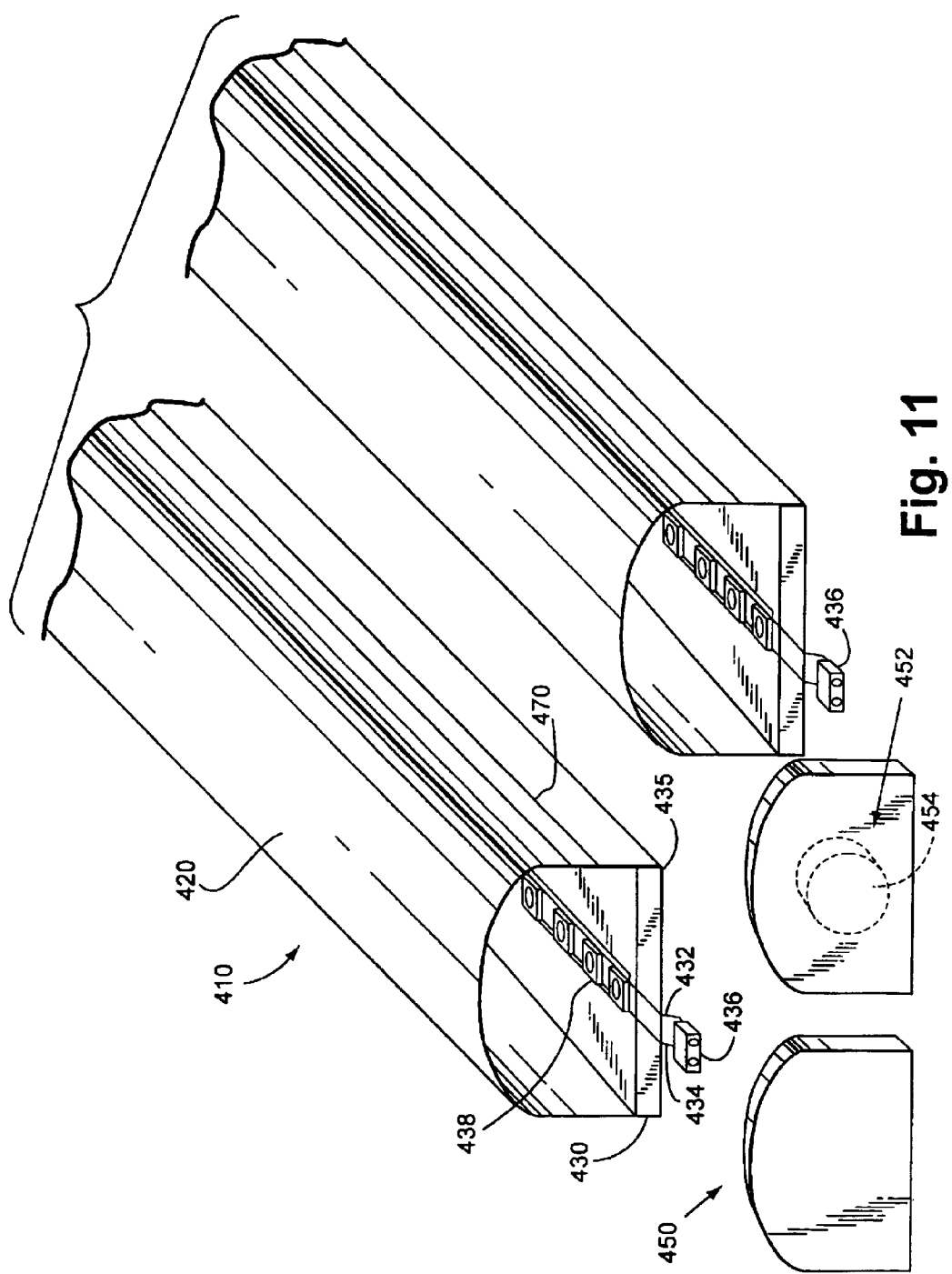
FIG. 11 is a broken, perspective view of a compound optical conductor according to a further embodiment of the invention.

A further embodiment of the invention as shown in FIG. 11 anticipates the use of an accessible electrical conductor along or near an outer portion of the optical conductor to allow LED light sources or other electrical lighting means along said optical conductor. The compound optical and electrical conductor ("compound conductor") can be of any length as shown by the broken line drawing of FIG. 11. The optical conductor 420 preferably is a fiber optic cable or an acrylic rod having a "D" cross-section and mounted over a base plate 430, but of course can be of any desired shape. Cap ends 450,452 are provided at each end of the optical conductor to direct light outwardly only at the intended point(s) along the light. The ends may have a reflective or other specific coating to meet the illumination needs. One or more of the ends may have a light source 454 such as an LED to illuminate the optical conductor.

The base plate 430 may be an aluminum base or a plastic base depending on the environment anticipated for the conductor. The base plate 430 preferably has a continuous slot or channel 435 formed in its periphery to receive at least one electrical light source such as an LED. The channel may also include discrete mounting points for the light sources

440, such as bayonet joints ("twist locks") (not shown) as are well known in the art or other mating plugs for receiving and securing the light sources in a fixed relation to the light. Alternatively, the lights could be fixed to the compound conductor by soldering, adhesives or other similar methods. These lights may be in addition to or substitutions for the LED 454 on the end cap(s).

The mounting points and connectors are preferably made of clear or translucent or transparent material to reduce interference with propagation of light from the light source. The connectors ("couplings") can also be etched or treated to disperse the illumination such that the couplings will illuminate with the cable.

Along the channel or slot, two oppositely poled electrical conductors 432,434 are aligned to provide power at any of the diverse points along the slot 434. These electrical conductors may be molded into the cable during manufacturing or secured afterwards. The conductors may have insulating jackets having a reflective property to "hide" the electric cables within the optical conductor and enhance the lighting especially when used in conjunction with an end cap ("side lighting") LED. The insulating jackets may also incorporate ridges, the height and spacing of which may be selected to increase the cable side light intensity and/or to maintain the side light distribution along the entire cable. Hollow passages or channels may be provide along the entire length of the optical conductor, or a portion thereof, created during or after the manufacture of the cable or acrylic rod through which the electrical wiring may be run.

An electrical plug 436 is provided at one end, and preferably at both ends of the electrical conductor to provide power to the electrical conductor and/or communicate the electrical power with a further compound conductor. See for instance, FIG. 2. While the electrical conductors are shown as wires, the electrical conductors could be a circuit board or other arrangements known to those of skill in the art.

Preferably the light sources mounted in the slot 435 are chip LEDs having an outer conductive surfaces which are positioned to respectively electrically communicate with one of the electrical conductor that track on either side of the slot. In this way mounting the LEDs in the predetermined or continuous positions along slot will ensure proper conduction of electricity through the contact with the respective conductive surfaces of the LED to light the LED. In this way, the electrical conductors can be mounted within the optical conductor and accessible to insert LED lights from the outside into electrical communication with the electrical conductors.

In a most preferred form of this embodiment, the LED or other light source can be secured to the base and a fiber optic cable or acrylic rod can be manufactured or formed over the LEDs creating a solid acrylic or fiber optic device. Alternatively, an acrylic or other material could be applied after the LEDs are secured to the base to form a complete enclosure of the optical conductor around the LEDs.

As shown in FIG. 11, more than one set of electrical conductors may be provided in the optical conductor. A second set of electrical conductors 470 can be provide along a different slot on the base 430, or as shown, on a side wall of the optical conductor. The conductors could be used to provide additional LEDs to illuminate the conductor. A clear liquid would preferably be used that cures to a hard or flexible consistency to encapsulate the LEDS within the optical conductor to form a light suitable for use to illuminate the outline of trucks, busses, automobiles, trains, aircraft, boats, barges, ships, and the like ("vehicles"), or building, bridges, railings, etc. Alternatively, an opaque housing or jacket (not shown) could cover all but a limited portion of the optical conductor to direct all of the light energy through a predetermined area such a predetermined lateral arc along the conductor. Additionally the electrical conductors could be arranged along the optical conductor to form a lighted power strip capable of receiving external lighting elements and accessories. The lights could also be provided internally if a hollow optical conductor were used by positioning the electrical conductors so that they are accessible to the internal surface of the hollow conductor outer wall.

Figure 13:
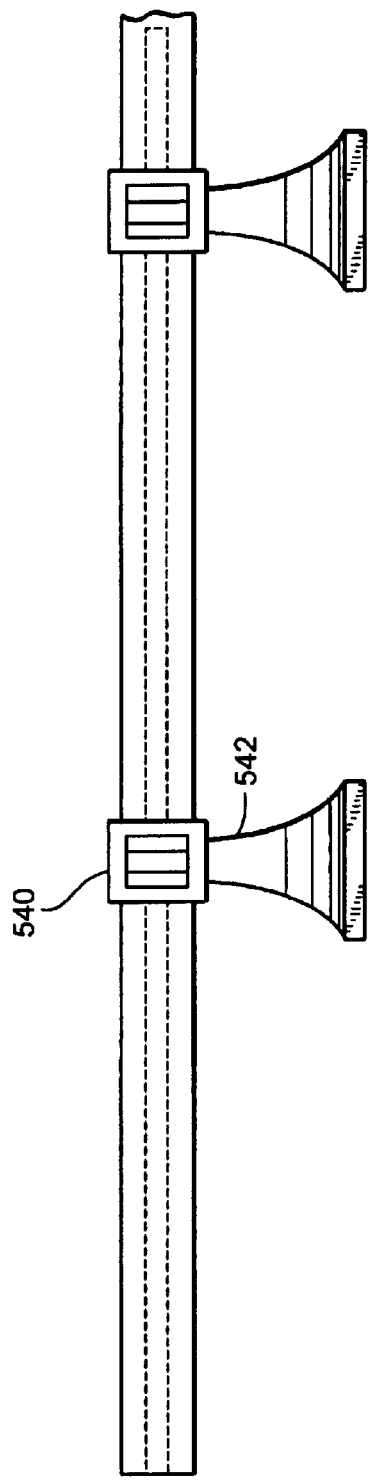
FIG. 13 shows a side view of a guard rail according to a further embodiment of the invention.

One particular preferred example of an environment for a compound conductor ("fiber link") is shown in FIGS. 13 & 14. A guard rail having a basic tubular structure can be covered by an illuminating sleeve ("retrofit") to convert the rail into an illuminated rail. One such retrofit structure is described in copending application Ser. No. 10/385,439 filed Mar. 12, 2003 entitled "Illuminated Guard Rail" which is incorporated herein by reference.

Figure 14A:
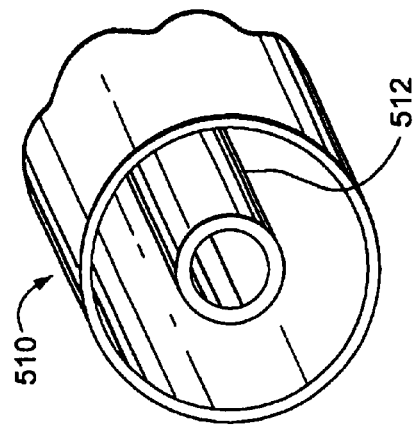
FIG. 14A shows a perspective view of an end of the guard rail.
Figure 15:
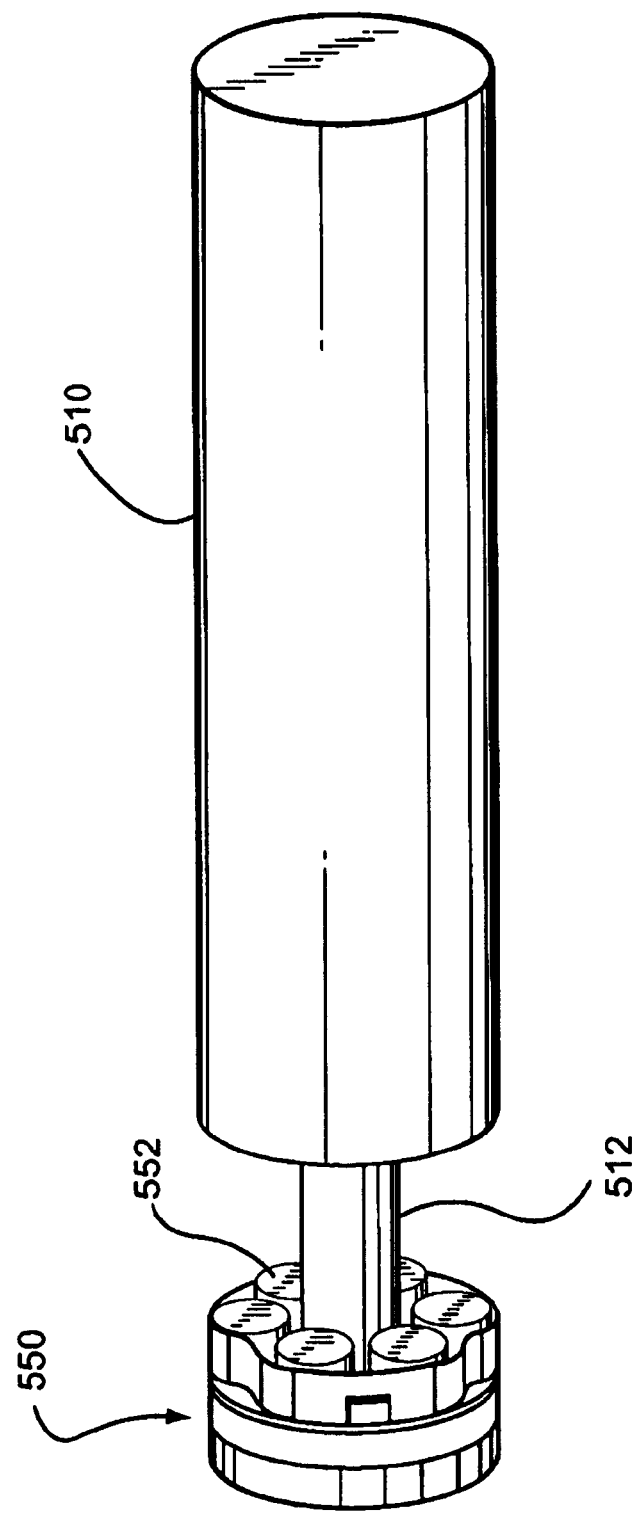
FIG. 15 shows a perspective view of the illumination for the guard rail.

A first retrofit embodiment of the invention as shown in FIGS. 13–15 uses an acrylic covering 510 for the round pipe like railing 512 along the side of an automotive bridge (not shown). As shown best in FIGS. 14*a* & 14*b,* the acrylic covering 510 is manufactured in two longitudinal half pieces 526,528 that fit together along the length of the rail section 512. In one half piece of acrylic 526, or in a longitudinal channel (not shown) molded in one or both pieces of acrylic where the two half coverings of acrylic join, is a channel 524 or longitudinal hollow sufficiently large enough in diameter to allow electrical conductor or wiring 530 to be installed therein. The ends of the wiring may have a connector 532 associated therewith to simplify electrical connection to other components.

Each end of the two half piece acrylic coverings 526,528 fits into a round fixture or collar 540 also made in two halves or otherwise formed to mount around the existing railing 512. The collars 540 are preferably located against the rail post 542 at each end of a rail section. The said fixtures 540 may contain low voltage dc power supplies, which are connected to the higher ac voltage source (electrical conductors 530) installed in the acrylic channel. Also contained in said fixture 540 is a ring 550 of super bright light emitting diodes 552 spaced at intervals and mounted proximate the edge of the end of the acrylic tube 554 or casing, such that the illumination from each LED 552 in the ring mount radiates illumination into the clear or colored acrylic clad 510. The acrylic is sufficiently thick, and the overhang of the ring or fixture over the acrylic end is sufficient to channel all of the illumination from the LEDs into the acrylic. A reflective coating 527 can be provided between the railing and the reflector to direct the light outward away from the railing. This may be formed with the acrylic covering 510 or added separately. A reflective coating 525 can also be provided around the passage 524 for the electrical conductors to optically "hide" the wires.

The electrical power from the low voltage supply installed in each collar unit is routed to the ring 550 of spaced LEDs through a normally closed contact of a small relay, preferably a mercury wetted relay. A third electrical conductor is routed through each section of acrylic covering and is connected to the coil of each relay in each collar, power supply unit. On long bridges that have miles of span, at about one mile intervals, special, larger collars can be used that have higher capacity low voltage power supplies (not shown) and the same relay as is in the smaller collars. Also included in the special large collar are preferably a small electric timing motor, timing contact and a weatherproof security key switch. The higher capacity low voltage power supply may be connected to one side of the timing contact and the third electrical conductor is connected to the other side of the timer contact. The third electrical conductor is routed approximately one half mile in each direction from the timer collar. Said third conductor connects to the relay coil in each collar over the one half mile run in each direction. The common of each relay is connected to the common ac source wire. If there is need for emergency personnel to assist a stranded motorist on the bridge, the responding unit will turn the key in the special large collar on each side of the bridge and cause all of the relays connected to the third conductor to operate and flash the (yellow) illumination on and off at a rate determined by the timing motor speed, and contact configuration, for a distance of approximately one mile on each side of the bridge. The wiring at each post or stanchion is looped behind the stanchion post in a rigid or flexible conduit connecting succeeding ring collar illumination power supply units.

A second retrofit embodiment of this instant invention preferably uses an acrylic one-piece sleeve unit into which is inserted the pipe rail section to illuminate the rail from within. The sleeve embodiment is intended for the original equipment manufacture of illuminated bridge rails, but may be used in other applications.

Additional variations in the retrofit embodiments include:

The round fixture or collar that incorporates the low voltage dc power supply may also support or incorporate a rechargeable battery back up and a solar panel or cell charge and recharging unit.

The illumination color may be any color or colors approved by the federal or local governing or approving agencies. The rails may illuminate one color, may flash on and off, may flash a first color followed by a second color, may flash a sequence of colors, may flash a plurality of colors, may flash sequentially, or may flash in any sequence or pattern.

The inner surface of the bridge rail acrylic covers or bridge rail pipe may be painted with or covered with a colored reflective or fluorescent coating visible by day through the clear acrylic covering. The fluorescent coating used could be excited or stimulated by exposure to black light at night or sunlight by day causing the rails to radiate light. This reflective coating would enhance night and day illumination of the bridge rails.

In a third retrofit embodiment of the invention, an elongated square or rectangular shaped acrylic railing is extruded or cast with a center hole running the length of the rail section. The railing may be covered with a florescent coating or made with a florescent resin that is stimulated by sunlight during the day that would illuminate during the night ("glow in the dark"). A separate stripe of enhanced acrylic rod or another lighted object such as rope, could be installed in the center hole of the rectangular rail section to illuminate at night. The illumination within the rail would stimulate the black light sensitive coating or the florescent resin of the rail section from within. The rectangular or square acrylic rail could be mounted in a track that may have a florescent coating stimulated by sunlight or black light.

In a fourth retrofit embodiment of this instant invention, a tubular reflective element is disposed within the inner perimeter of a mounting ring of LEDs which is optically similar to the passageway 524 formed in the acrylic covering. The electrical conductive means is routed from one section of illuminated railing to the next within said tubular reflective element. Said tubular reflective element is mounted within a light transmissive tube with an inside diameter that is greater than the outside diameter of the ring mounted LEDs creating a space between said inner reflective tube and said outer light transmissive tube. The spacing between said inner and said outer tube is equalized around the circumference and maintained by spacers (not shown). Said spacers may be made of light transmissive material or of non light transmissive material that displays a minimum side profile so as not to block illumination from said ring diodes. Air may be evacuated from the space between the inner and outer tubes, or the assembly of components may take place in a low humidity environment, or a moisture-absorbing desiccant may be placed between said tubes during assembly before the end caps are encapsulated with an airtight seal. The end caps contain electrical connective means so that electrical power is conducted from a first rail section to a succeeding rail section.

It is to be understood that the present invention is not limited to the embodiments described above, but encompasses any and all embodiments within the scope of the following claims.

We claim:

1. A compound optical and electrical device, comprising:
   compound optical and electrical conductor;
   an optical conductor and an electrical conductor disposed within said compound conductor;
   cover circumferentially surrounding substantially all of said compound, said cover being partially inwardly reflective and partially translucent for reflecting a portion of the light along the length of said optical conductor and for emitting a portion of the light laterally from said optical conductor along substantially the entire length of the optical conductor.

2. The compound device according to claim 1, including:
   at least one compound connector for removably attaching to said at least one compound conductor;
   means for concentrically connecting said connector with said optical conductor of said compound conductor for passing light therethrough, and;
   means for electrically connecting said connector to said at least one electrical conductor of said compound conductor.

3. The compound device according to claim 2, including:
   electrical lighting means disposed within said connector, for compensating for light attenuation from said optical conductor of aid compound conductor, and;
   said lighting means receiving operative electrical power from aid electrical conductor of said compound conductor.

4. The compound device according to claim 3,
   wherein said electrical conductor is formed on a circuit board.

5. The compound device according to claim 4, wherein:
   each of said lights comprises at least one chip light emitting diode; and
   each of said lights is colored differently from one another or selectively providing differently colored light to said optical conductor as desired.

6. The compound device according to claim 5, wherein said said optical conductor is an acrylic formed over and encapsulates said at least one chip light emitting diode.

7. The compound device according to claim 1, wherein said electrical conductor is contained within said optical conductor.

8. The compound device according to claim 1, wherein said electrical conductor is contained within said cover.

9. The compound device according to claim 1 further including a reflective coating around a portion of the, circumference of said at least one optical conductor.

10. The compound device according to claim 1, wherein:
   each of said lights comprises at least one chip light emitting diode; and
   each of said lights is colored differently from one another or selectively providing differently colored light to said optical conductor as desired.

11. The compound device according to claim 1, wherein:
   each of said lights comprises a plurality of one chip light emitting diodes; and
   each of said lights is colored differently from one another or selectively providing differently colored light to said optical conductor as desired.

12. A compound optical and electrical conducting assembly, comprising:
   a plurality of elongate compound optical and electrical conductors;
   at least one optical conductor and at least one electrical conductor disposed within each of said compound conductors;
   a partially optically translucent cover circumferentially surrounding the majority of each of said compound conductors;
   at least one compound connector for removably attaching between two of said compound conductors;
   means for concentrically connecting said connector with each said optical conductor of a corresponding one of said compound conductors for passing light therethrough, and;
   means for electrically connecting said connector to each said electrical conductor of a corresponding one of said compound conductors.

13. The compound assembly according to claim 12, including:
   electrical lighting means disposed within said connector, for compensating for light attenuation from each said optical conductor if each of said compound conductors; and
   said lighting means receiving operative electrical power from at least one said electrical conductor of at least one of said compound conductors.

14. The compound assembly according to claim 13, wherein:
   said lighting means of said connector further comprises a plurality of lights; and
   said at least one electrical conductor of each of said compound conductors further comprises a plurality of electrical conductors corresponding in number to said plurality of lights, for selectively providing power to at least one of said lights a desired.

15. The compound assembly according to claim 14, wherein:
   each of said lights comprises a light emitting diode; and
   each of said lights is colored differently from one another: or selectively providing differently colored light to at least one of said optical conductors as desired.

16. The compound assembly according to claim 15, wherein at least one of said light emitting diodes is a chip light emitting diode.

17. The compound assembly according to claim 12, wherein at least one said electrical conductor is contained within said optical conductor.

18. The compound assembly according to claim 12, wherein at least one said electrical conductor is contained within said cover.

19. The compound assembly according to claim 12, further including:
   at least one end cap assembly;
   means for concentrically connecting said end cap assembly with said optical conductor of a corresponding one of said compound conductors for passing light therethrough;
   at least one said electrical lighting means disposed within said end cap assembly; and
   means for electrically connecting said at least one electrical lighting means of said end cap assembly to said electrical conductor of a corresponding one of said compound conductors.

20. The compound optical and electrical conducting assembly of claim 12, wherein said at least one compound connector for removably attaching between two of said compound conductors is configured to connect said a plurality of elongate compound optical and electrical conductors in a t-shape.

21. The compound optical and electrical conducting assembly of claim 12, wherein said at least one compound connector for removably attaching between two of said compound conductors is multifaceted.

22. The compound optical and electrical conducting assembly of claim 12, wherein said at least one compound connector for removably attaching between two of said compound conductors is configured to connect said a plurality of elongate compound optical and electrical conductors in a star shape.

23. The compound optical and electrical conducting assembly of claim 12, wherein said at least one compound connector for removably attaching between two of said compound conductors is configured to connect said a plurality of elongate compound optical and electrical conductors in a cross shape.

24. The compound optical and electrical conducting assembly of claim 12, wherein said at least one compound connector for removably attaching between two of said compound conductors is configured to connect said a plurality of elongate compound optical and electrical conductors in a spoked shape.

* * * * *